United States Patent
Kokubun et al.

(10) Patent No.: US 7,894,221 B2
(45) Date of Patent: Feb. 22, 2011

(54) DETECTION CIRCUIT

(75) Inventors: Masatoshi Kokubun, Kasugai (JP);
Takashi Matsumoto, Kasugai (JP)

(73) Assignee: Fujitsu Semiconductor Limited, Yokohama (JP)

(*) Notice: Subject to any disclaimer, the term of this patent is extended or adjusted under 35 U.S.C. 154(b) by 346 days.

(21) Appl. No.: 12/021,007

(22) Filed: Jan. 28, 2008

(65) Prior Publication Data
US 2008/0197831 A1  Aug. 21, 2008

(30) Foreign Application Priority Data
Feb. 16, 2007  (JP) .............................. 2007-036536

(51) Int. Cl.
*H02M 3/335* (2006.01)
(52) U.S. Cl. ........................... 363/80; 323/299; 323/906
(58) Field of Classification Search ................. 320/106, 320/110, 118, 116, 120, 136, 160, 139; 307/64, 307/66, 150; 323/225, 271–272, 282–285, 323/312–315, 357, 906, 909; 363/16–20, 363/79, 37, 80

See application file for complete search history.

(56) References Cited

U.S. PATENT DOCUMENTS
5,682,305 A * 10/1997 Kurokami et al. .............. 363/79

FOREIGN PATENT DOCUMENTS
JP  3428955 B2  5/2003

* cited by examiner

*Primary Examiner*—Rajnikant B Patel
(74) *Attorney, Agent, or Firm*—Fujitsu Patent Center

(57) ABSTRACT

A detection circuit for generating a control signal for controlling output voltage of an AC adapter. The detection circuit for an electronic device receives power information from an external power supply via a cable to generate the control signal that controls DC input voltage output from the external power supply. In the detection circuit, a correction voltage generation circuit generates a correction voltage in correspondence with the parasitic resistance of the cable. A power information correction circuit corrects the power information provided from the external power supply via the cable with the correction voltage to generate corrected power information. A detection signal generation circuit calculates the total power amount of the electronic device and generates a power detection signal corresponding to the total power amount. The control signal generation circuit generates the control signal based on the corrected power information and the power detection signal.

16 Claims, 3 Drawing Sheets

DETECTION CIRCUIT

CROSS-REFERENCE TO RELATED APPLICATIONS

This application is based upon and claims the benefit of priority from the prior Japanese Patent Application No. 2007-036536, filed on Feb. 16, 2007, the entire contents of which are incorporated herein by reference.

BACKGROUND

This application relates to a detection circuit, and more specifically, to a detection circuit mounted on a power supply system.

An electronic device includes a charging circuit for charging a rechargeable battery serving as a drive power supply. Japanese Patent Publication No. 3428955 discloses a charging circuit for charging a rechargeable battery with charging current supplied from an external power supply. The operation of the charging circuit will now be described with reference to FIG. 1.

A charging circuit 11, which in incorporated in an electronic device, is supplied with DC adapter voltage VAC from an input power adapter 12 coupled to the electronic device. The charging circuit 11 is a DC/DC converter, which generates output voltage Vout from the adapter voltage VAC and controls the output voltage Vout based on a detection value of an output current Iout or the like. Specifically, the charging circuit 11 includes a current amplifier 13a, which is coupled to the two ends of a resistor R1 to detect the output current Iout, and a current amplifier 13b, which is coupled to the two ends of a resistor R2 to detect charging current Ichg supplied to a battery BT. The current amplifiers 13a and 13b are coupled to error amplifiers 14a and 14b, respectively. The terminal voltage of the battery BT is supplied to an error amplifier 14c, and the voltage between the terminals of the resistor R1 is supplied to a multiplier 15. The multiplier 15 is coupled to an error amplifier 14d. The multiplier 15 detects the total power amount supplied from the input power adapter 12 based on the current flowing to the resistor R1 and the terminal voltage (i.e., adapter voltage VAC) of the resistor R1. Then, the multiplier 15 outputs a voltage PWRO proportional to the power amount. The error amplifiers 14a to 14d generate control current Isc based on the output current Iout flowing to the resistor R1, the charging current Ichg flowing to the resistor R2, the terminal voltage of the battery BT, and the total power amount (PWRO). A pulse width modulator (PWM) 17 changes the duty cycle for activating and inactivating transistors T1 and T2 based on the control current Isc. The output power of the charging circuit 11 is controlled in accordance with the duty cycle. The battery BT is charged by the charging current Ichg when power is supplied to a system circuit 19 from the charging circuit 11 via a system DC/DC converter 18.

There have been recent demands for controlling the AC adapter to control the output voltage. In this case, the input power adapter 12 shown in FIG. 1 internally incorporates the PWM 17 and the transistors T1 and T2 (e.g., circuit portion depicted in box A drawn by double-dashed line A in FIG. 1), which are controlled by the PWM 17. In such a configuration, the control current Isc generated by the amplifiers 13a, 13b, 14a, 14b, and 14c and the multiplier 15 is supplied from the electronic device to the input power adapter 12. The output voltage of the input power adapter 12 is thus controlled by the control current Isc.

Power information is provided from the input power adapter 12 to the electronic device when the output power of the input power adapter 12 is controlled. The power information is provided as a power limiting signal PWRM or the like from the PWM 17, which is incorporated in the input power adapter 12, to the error amplifier 14d of the electronic device via a cable. The error amplifier 14d amplifies the difference between a power detection signal PWRO output from the multiplier 15 and the power limiting signal PWRM to generate an error voltage. However, the cable includes a resistance component (parasitic resistance). Thus, the power limiting signal PWRM provided to the error amplifier 14d is offset relative to ground level due to the parasitic resistance of the cable. Specifically, the voltage of the power information provided to the error amplifier is lowered by the offset amount. Therefore, the power information is erroneously transmitted, and the circuits in the electronic device generate the control current Isc based on the erroneous power information. As a result, an error voltage deviated from the power supplied from the input power adapter 12 is output from the error amplifier 14d. That is, the generated control current Isc contains a deviation. Accordingly, the required adapter voltage VAC may not be accurately supplied to the electronic device 31.

SUMMARY

One aspect of embodiments is a detection circuit for arranging in an electronic device and generating a control signal for controlling direct current input voltage generated by an external power supply based on power information provided from the external power supply via a cable. The detection circuit includes a correction voltage generation circuit that generates correction voltage in accordance with a parasitic resistance of the cable. A power information correction circuit is coupled to the correction voltage generation circuit to receive the power information via the cable. The power information correction circuit corrects the power information with the correction voltage and generates corrected power information. A detection signal generation circuit calculates a total power amount of the electronic device from the input voltage and input current, which is supplied from the external power supply to the electronic device, to generate a power detection signal corresponding to the total power amount. A control signal generation circuit is coupled to the power information correction circuit and the detection signal generation circuit to generate the control signal from the corrected power information and the power detection signal.

A further aspect of the embodiments is a power supply system including an external power supply that generates direct current input voltage. An electronic device operates on the input voltage supplied from the external power supply via a cable. The external power supply includes a voltage control circuit that generates the input voltage and provides power information corresponding to the input voltage to the electronic device via the cable. The electronic device includes a detection circuit for generating a control signal that controls the input voltage based on the power information. The detection circuit includes a correction voltage generation circuit that generates correction voltage in correspondence with a parasitic resistance of the cable. A power information correction circuit is coupled to the correction voltage generation circuit to receive the power information via the cable in which the power information correction circuit corrects the power information with the correction voltage and generates corrected power information. A detection signal generation circuit calculates a total power amount of the electronic device from the input voltage and input current, which is supplied from the external power supply to the electronic device and generates a power detection signal corresponding to the total power amount. A control signal generation circuit is coupled to the power information correction circuit and the detection signal generation circuit to generate the control signal based on the corrected power information and the power detection signal.

Another aspect of the embodiments is a method for controlling direct current input voltage generated by an external power supply based on power information provided from the external power supply comprising receiving the power information via a cable, generating correction voltage in accordance with a parasitic resistance of the cable, correcting the power information with the correction voltage to generate corrected power information, calculating a total power amount of an electronic device from the input voltage and input current, which is supplied from the external power supply, to generate a power detection signal corresponding to the total power amount, and generating a control signal from the corrected power information and the power detection signal.

Other aspects and advantages of the embodiments will become apparent from the following description.

DETAILED DESCRIPTION OF THE PREFERRED EMBODIMENTS

Figure 1:
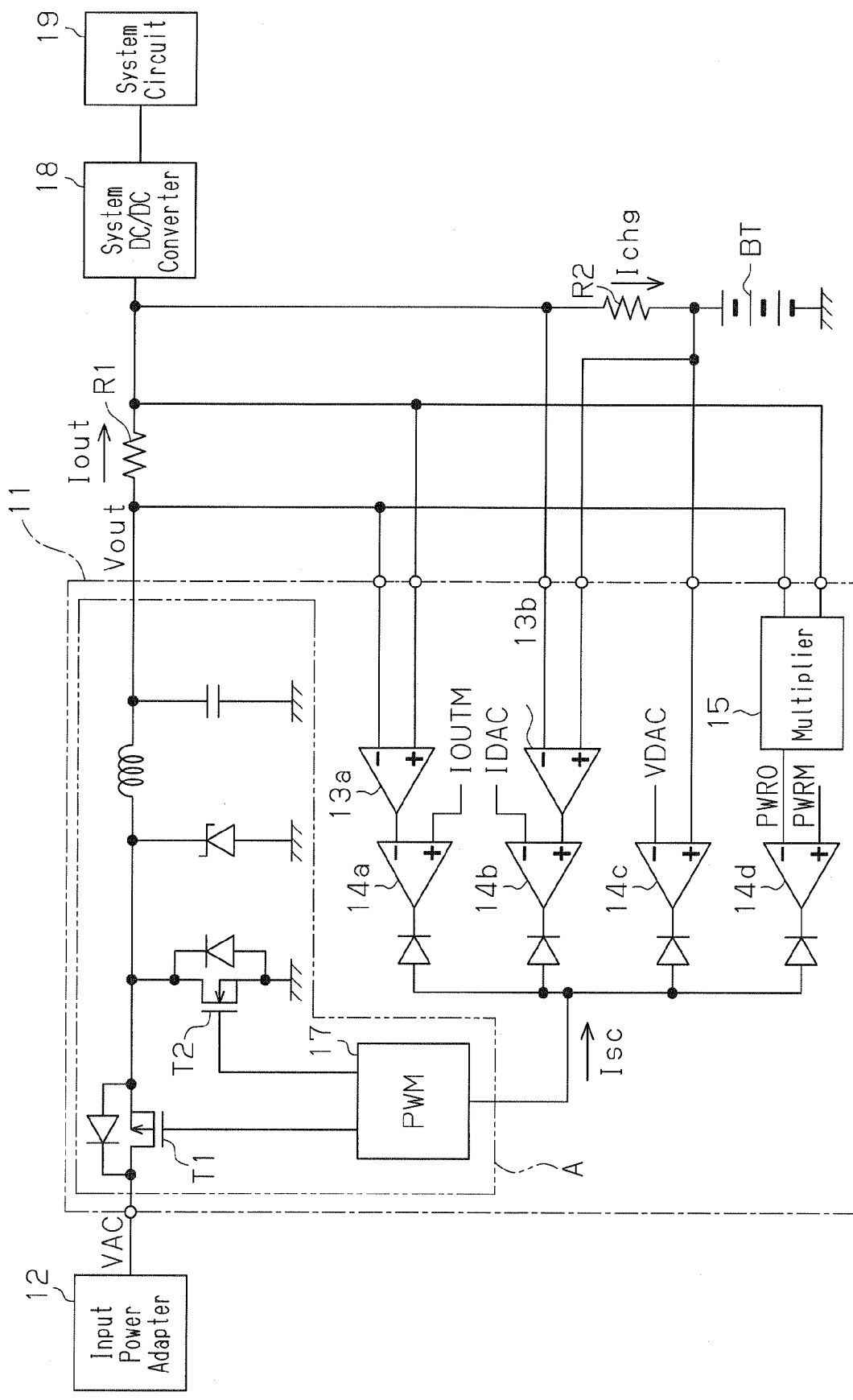
FIG. 1 is a schematic circuit diagram of a conventional power supply system.

The following disclosure illustrates a detection circuit and power supply system for accurately generating a control signal for controlling the output power of an AC adapter.

In the drawings, like numeral are used for like elements throughout.

A power supply system according to one preferred embodiment will now be described according to FIGS. 2 and 3.

Figure 2:
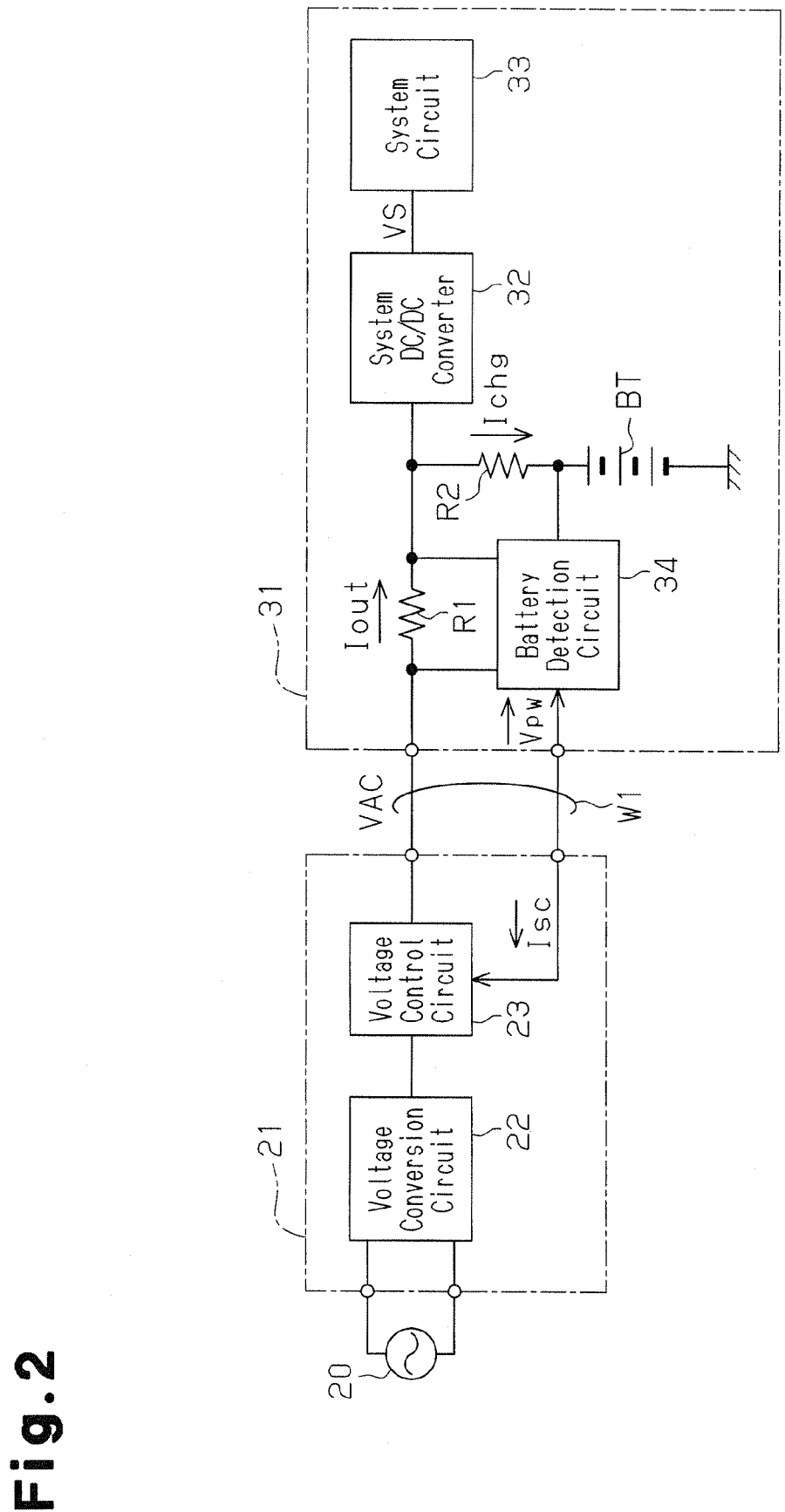
FIG. 2 is a schematic block diagram of a power supply system according to one embodiment.

As shown in FIG. 2, the power supply system includes an AC adapter 21, which serves as an external power supply, and an electronic device 31, which is coupled to the AC adapter 21 via a cable W1. The AC adapter 21 is an accessory of the electronic device 31. In one embodiment, the cable W1 has a first end pigtail-fixed to the AC adapter 21 and a second end provided with a plug coupled to a connector of the electronic device 31.

The AC adapter 21 is coupled to an AC power supply 20, and commercial AC voltage from the AC power supply 20 is supplied to a voltage conversion circuit 22 of the AC adapter 21. The voltage conversion circuit 22 converts AC voltage to DC voltage and then supplies the DC voltage to a voltage control circuit 23. The voltage control circuit 23 generates adapter voltage VAC from the DC voltage generated by the voltage conversion circuit 22 based on control current Isc (control signal) provided from the electronic device 31 via the cable W1. The adapter voltage VAC is supplied as input voltage to the electronic device 31 via the cable W1. The voltage control circuit 23 provides power information voltage Vpw (power information) corresponding to the amount of power supplied from the AC adapter 21 to the electronic device 31 via the cable W1.

The adapter voltage VAC is supplied to a system DC/DC converter 32 via a resistor R1. A rechargeable battery (battery) BT is coupled to the system DC/DC converter 32 via a resistor R2. The system DC/DC converter 32 generates system voltage Vs from the input voltage based on the adapter voltage VAC and the battery voltage supplied from the battery BT. Accordingly, at least either one of the power supplied from the AC adapter 21 and the power supplied from the battery BT is supplied to a system circuit 33. The system circuit 33 is a circuit that realizes various functions of the electronic device 31.

The resistor R1 and the resistor R2 are coupled to a battery detection circuit 34. The battery detection circuit 34 is coupled to the two terminals of the resistor R1 and to a node between the resistor R2 and the battery BT. The battery detection circuit 34 detects current Iout flowing to the resistor R1 based on the potential difference between the terminals of the resistor R1. Furthermore, the battery detection circuit 34 detects the total output power from the potential difference (i.e., current Iout) between the terminals of the resistor R1, the terminal voltage (i.e., adapter voltage VAC) of the resistor R1, and the power information voltage Vpw. The battery detection circuit 34 also detects the current Ichg flowing to the resistor R2 based on the potential difference between the terminals of the resistor R2. The battery detection circuit 34 further detects the voltage (or adapter voltage VAC) and terminal voltage of the battery BT supplied to the system DC/DC converter 32. The battery detection circuit 34 generates the control current Isc based on the detected current, the detected voltage, and the total output power. The control current Isc is supplied to the voltage control circuit 23 of the AC adapter 21 via the cable W1. Therefore, the voltage control circuit 23 of the AC adapter 21 controls the adapter voltage VAC in accordance with the control current Isc output from the battery detection circuit 34.

An example of the configuration of the AC adapter 21 will now be discussed.

Figure 3:
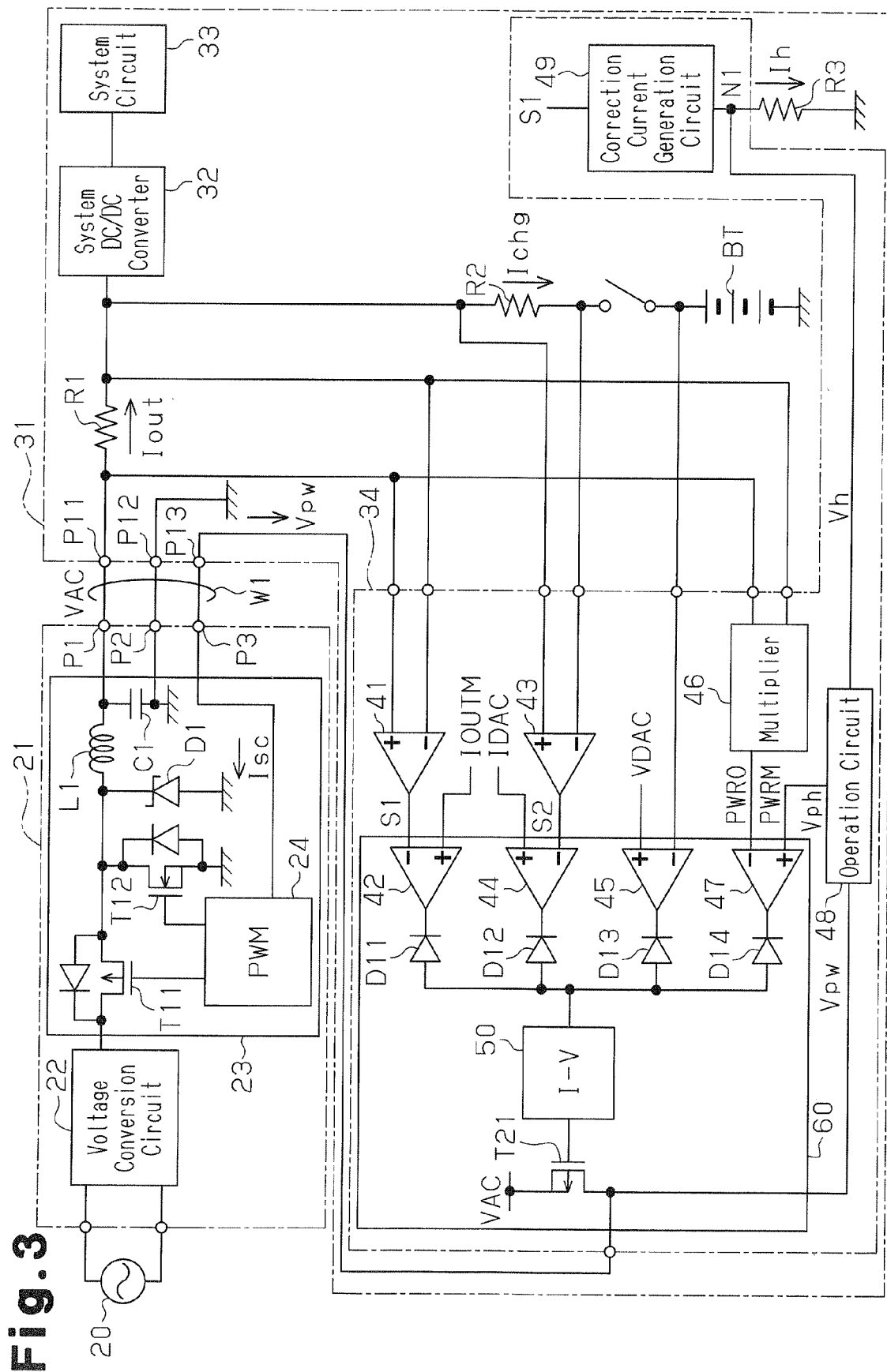
FIG. 3 is a schematic circuit diagram of the power supply system shown in FIG. 2.

As shown in FIG. 3, the output terminal of the voltage conversion circuit 22 is coupled to a first terminal (e.g., source) of a first transistor T11, and a second terminal (e.g., drain) of the first transistor T11 is coupled to a first terminal of a choke coil L1. A second terminal of the choke coil L1 is coupled to a first output terminal P1 of the AC adapter 21. The second terminal of the first transistor T11 is also coupled to a first terminal (e.g., drain) of a second transistor T12. A second terminal (e.g., source) of the second transistor T12 is coupled to ground. A control terminal (gate) of the first transistor T11 and a control terminal (gate) of the second transistor T12 are coupled to a pulse width modulator (PWM) 24. In one embodiment, the first transistor T11 is a P-channel MOS transistor, and the second transistor T12 is an N-channel MOS transistor. As shown in FIG. 3, each transistor T11, T12 has a body diode.

The first terminal of the choke coil L1 is coupled to the cathode of a diode D1, and the anode of the diode D1 is coupled to ground. The first output terminal P1 of the AC adapter 21 is coupled to a first terminal of a capacitor C1, and a second terminal of the capacitor C1 is coupled to ground. A second output terminal P2 of the AC adapter 21 is coupled to ground, and a third output terminal P3 of the AC adapter 21 is coupled to the PWM 24. The first to third terminals P1 to P3 of the AC adapter 21 are respectively coupled to first to third terminals P11 to P13 of the electronic device 31 by the cable W1. The choke coil L1 and the capacitor C1 form a smoothing circuit.

The control current Isc is supplied to the PWM 24 from the battery detection circuit 34 via the third output terminals P3 and P13. The PWM 24 also supplies the power information voltage Vpw to the battery detection circuit 34 via the third terminals P3 and P13. The PWM 24 activates and inactivates the first transistor T11 and the second transistor T12 in a complementary manner at a predetermined duty cycle. The output current of the transistor T11 is controlled by the switching operation of the first transistor T11. The output current is smoothed by the smoothing circuit (L1 and C1). When the first transistor T11 is activated, the output voltage of the voltage conversion circuit 22 is supplied to the smoothing circuit (L1 and C1) via the transistor T11. When the first transistor T11 is inactivated, a current path is formed through the choke coil L1 and the diode D1, and the energy stored in the choke coil L1 during activation of the first transistor T11 is discharged to the first output terminal P1.

The PWM 24 changes the duty cycle in response to the control current Isc. Specifically, the PWM 24 changes the duty cycle so as to change the activated period of the first transistor T11 in accordance with the current value of the control current Isc. The adapter voltage VAC output from the AC adapter 21 is in correspondence with the activated period of the first transistor T11. If the activated period of the first transistor T11 is long, the energy stored in the choke coil L1 increases, and the adapter voltage VAC rises. If the activated period of the first transistor T11 is short, the energy stored in the choke coil L1 decreases and lowers the adapter voltage VAC.

Accordingly, the AC adapter 21 changes the adapter voltage VAC in accordance with the control current Isc. When the control current Isc is not supplied to the AC adapter 21, the AC adapter 21 generates the adapter voltage VAC at minimum voltage. In this case, the control current Isc is 0 (zero) when the AC adapter 21 coupled to the AC power supply 20 is coupled to the electronic device 31. Thus, the adapter voltage VAC supplied to the electronic device 31 is minimum voltage. This prevents a large inrush current from flowing to the battery BT on the electronic device 31.

The structure of the battery detection circuit 34 on the electronic device 31 will now be described.

The adapter voltage VAC generated by the AC adapter 21 is supplied to the DC/DC converter 32 via the resistor R1, which is coupled to the first input terminal P11 of the electronic device 31. The power information voltage Vpw output from the PWM 24 of the AC adapter 21 is supplied to the battery detection circuit 34 via the third terminal P13 of the electronic device 31.

The current Iout supplied from the AC adapter 21 flows to the resistor R1 of the electronic device 31. The terminals of the resistor R1 are coupled to two input terminals of a current amplifier 41 in the battery detection circuit 34. The current amplifier 41 detects the current Iout flowing to the resistor R1, that is, the output current of the AC adapter 21, and generates a current detection signal S1 corresponding to the detection value of the output current Iout. An error amplifier 42 includes an inversion input terminal for receiving the current detection signal S1 and a non-inversion input terminal for receiving a current reference signal IOUTM. The current reference signal IOUTM is set to a voltage value that corresponds to the total current amount (i.e., current Iout) used in the electronic device 31. The error amplifier 42 compares the current detection signal S1 and the current reference signal IOUTM and generates an error voltage (first error voltage) corresponding to the comparison result.

The two terminals of the resistor R2 coupled to the battery BT are coupled to the two input terminals of a current amplifier 43. The current amplifier 43 detects the current Ichg flowing to the resistor R2, that is, the charging current Ichg to the battery BT, and generates a charging current detection signal S2 corresponding to the detection value of the charging current Ichg. An error amplifier 44 includes an inversion input terminal for receiving the charging current detection signal S2 and a non-inversion input terminal for receiving a limiting current signal IDAC. The limiting current signal IDAC is set to the voltage value corresponding to the charging current Ichg of the battery BT. The error amplifier 44 amplifies the difference between the voltage of the charging current detection signal S2 and the voltage of the limiting current signal IDAC to generate an error voltage.

A node between the resistor R2 and the battery BT is coupled to an inversion input terminal of an error amplifier 45. The voltage limiting signal VDAC is input to a non-inversion input terminal of the error amplifier 45. The error amplifier 45 amplifies the difference between the terminal voltage of the battery BT and the voltage limiting signal VDAC to generate an error voltage.

The two terminals of the resistor R1 are coupled to a multiplier 46 serving as a detection signal generation circuit. The multiplier 46 detects the adapter voltage VAC based on the terminal voltage of the resistor R1 and detects the total current amount of the electronic device 31 based on the voltage between the two voltages of the resistor R1. The multiplier 46 obtains the total power amount by multiplying the adapter voltage VAC and the total current amount. Then, the multiplier 46 provides an error amplifier 47 with a power detection signal PWRO corresponding to the total power amount. An operation circuit 48 serving as a power information correction circuit is coupled to the error amplifier 47. The power information voltage Vpw is supplied from the AC adapter 21 to the operation circuit 48. The operation circuit 48 is coupled to a node N1 between a correction current generation circuit 49 and a resistor R3 serving as a correction resistor circuit. Further, the operation circuit 48 receives the voltage at the node N1 as correction voltage Vh. In one embodiment, the operation circuit 48 is an adder circuit, which adds the correction voltage Vh to the power information voltage Vpw, and supplies correction information voltage (corrected power information) Vph indicating the addition result to the error amplifier 47 as the power limiting signal PWRM. In one embodiment, the correction voltage generation circuit is formed by the resistor R3 and correction current generation circuit 49.

The resistance value of the resistor R3 is set to a value proportional to the parasitic resistance of the cable W1. The resistor R3 is externally attached to the semiconductor device that incorporates the battery detection circuit 34. The current detection signal S1 generated by the current amplifier 41 is provided to the correction current generation circuit 49. The correction current generation circuit 49 generates a correction current Ih corresponding to the input current Iout supplied from the AC adapter 21 based on the current detection signal S1. The correction current Ih flows to the resistor R3. Thus, the correction current generation circuit 49 generates the correction voltage Vh, which is substantially equal to the offset amount (i.e., amount of voltage shift from ground level) of the power information voltage Vpw that is caused by the parasitic resistance of the cable W1 at the node N1 between the correction current generation circuit 49 and the resistor R3. As described above, the operation circuit 48 supplies the correction information voltage Vph, which is generated by adding the correction voltage Vh to the power information voltage Vpw, to the error amplifier 47 as the power limiting signal PWRM.

Due to the offset from ground level by the parasitic resistance of the cable W1, the power information voltage Vpw input to the operation circuit 48 indicates a value lower than the power information voltage Vpw output from the PWM 24. Thus, even if the PWM 24 outputs power information of 50 watts (W), due to the parasitic resistance of the cable W1, the operation circuit 48 receives the power information of 40 watts (W). The correction current generation circuit 49 and the correction resistor R3 generate the correction voltage Vh corresponding to 10 watts (W) based on the current detection signal S1. Thus, the operation circuit 48 generates the correction information voltage Vph corresponding to the voltage of the power information output from the PWM 24 by adding the correction voltage Vh to the power information (power information voltage Vpw) that is lowered by offset.

The error amplifier 47 amplifies the difference between the power limiting signal PWRM provided from the operation circuit 48 and the power detection signal PWRO provided from the multiplier 46 to generate an error voltage. In this case, the operation circuit 48 outputs the correction information voltage Vph that is substantially equal to the voltage of the power information output from the PWM 24 as the power limiting signal PWRM. Therefore, the error amplifier 47 generates the error voltage at a value that is substantially the same as the power information output from the PWM 24.

The cathodes of diodes D11, D12, D13, and D14 are respectively coupled to the output terminals of the error amplifiers 42, 44, 45, and 47. The anodes of the diodes D11 to D14 are coupled together to a current voltage conversion circuit 50. The diodes D11 to D14 transmit the current (error current) corresponding to the largest one of the error voltages output from the error amplifiers 42, 44, 45, and 47 to the current voltage conversion circuit 50. In other words, the largest one of the four error detection values is provided to the current voltage conversion circuit 50.

The output terminal of the current voltage conversion circuit 50 is coupled to the control terminal (gate) of a transistor T21, which forms a constant current source (current control circuit). Therefore, the current voltage conversion circuit 50 supplies an output voltage that is proportional to the input current to the gate of the transistor T21. The transistor T21 is a P-channel MOS transistor in one embodiment. The adapter voltage VAC is supplied to the source of the transistor T21. The drain of the transistor T21 is coupled to the third terminal P13 of the electronic device 31. The second terminal P12 of the electronic device 31 is coupled to ground.

The transistor T21 operates as a resistor body having a resistance value corresponding to the gate voltage and enables the flow of the control current Isc in correspondence with the resistance value. The transistor T21, which is a P-channel MOS transistor, indicates a large resistance value at a high gate voltage and a small resistance value at a low gate voltage. Therefore, an increase in the output voltage of the current voltage conversion circuit 50, that is, the error detection value supplied to the current voltage conversion circuit 50, increases as the control current Isc decreases. Further, a decrease in the output voltage of the current voltage conversion circuit 50 increases the control current Isc.

In one embodiment, the error amplifiers 42, 44, 45, and 47, the diodes D11, D12, D13, and D14, the current voltage conversion circuit 50, and the transistor T21 form a control signal generation circuit 60.

When the battery BT is not coupled to the electronic device 31, the battery terminal voltage supplied to the error amplifier 45 is 0 (zero). The charging current detected by the error amplifier 44 is also 0. In this state, the error detection value (i.e., input current) supplied to the current voltage conversion circuit 50 increases. Thus, the control current Isc flowing from the transistor T21 decreases. Therefore, the adapter voltage VAC output from the voltage control circuit 23 of the AC adapter 21 becomes small. When the battery BT is coupled to the electronic device 31 in such a state, the flow of inrush current to the battery BT is suppressed since the difference between the terminal voltage of the battery BT and the adapter voltage VAC supplied from the AC adapter 21 is small.

In the above power supply system, the battery detection circuit 34 function to reduce the control current Isc when the operation power supply voltage decreases such as when the electronic device 31 stops operating. The AC adapter 21 then generates a low adapter voltage VAC. Thus, a margin for the power supply voltage is provided in the operation of the battery detection circuit 34, and the operating conditions are moderated. Furthermore, since the AC adapter 21 supplies low adapter voltage VAC to the electronic device 31, high adapter voltage VAC will not be supplied to the electronic device 31 when the electronic device 31 stops operating. Therefore, the circuits in the electronic device 31 are prevented from being damaged.

The power supply system of the embodiment has the advantages described below.

(1) The correction current generation circuit 49 generates the correction current Ih proportional to the current supplied from the AC adapter 21 based on the current detection signal S1. The correction current Ih flows to the correction resistor R3. As a result, the correction current generation circuit 49 generates the correction voltage Vh to be substantially equal to the offset amount (amount of voltage shift from ground level) of the power information voltage Vpw caused by the parasitic resistance of the cable W1 at the node N1 between the correction current generation circuit 49 and the resistor R3. The operation circuit 48 generates the correction information voltage Vph by adding the correction voltage Vh to the power information voltage Vpw. Further, the operation circuit 48 supplies the correction information voltage Vph to the error amplifier 47 as the power limiting signal PWRM. That is, the operation circuit 48 generates the power limiting signal PWRM, which is in correspondence with the voltage of the power information output from the PWM 24, by using the correction voltage Vh to correct the power information voltage Vpw, which has been offset and lowered. Accordingly, the error amplifier 47 generates the error voltage based on accurate power information (power information voltage Vpw). As a result, the battery detection circuit 34 generates the control current Isc without an error that would be caused by the parasitic resistance of the cable W1.

(2) The AC adapter 21 changes the adapter voltage VAC in accordance with the control current Isc. When the control current Isc is not supplied to the AC adapter 21, the AC adapter 21 generates the adapter voltage VAC at minimum voltage. Therefore, when the AC adapter 21, which is coupled to the AC power supply 20, is coupled to the electronic device 31, the adapter voltage VAC is supplied to the electronic device 31 at minimum voltage since the control current Isc is 0 (zero). Thus, a large inrush current is prevented from flowing to the battery BT coupled to the electronic device 31.

(3) When the battery BT is not coupled to the electronic device 31, the battery terminal voltage supplied to the error amplifier 45 and the charging current detected by the error amplifier 44 are 0. In this state, the input current supplied to the current voltage conversion circuit 50 is large. Thus, the control current Isc flowing from the transistor T21 is small. Therefore, the voltage control circuit 23 of the AC adapter 21 outputs a low adapter voltage VAC. When the battery BT is coupled to the electronic device 31 in such a state, the flow of inrush to the battery BT is suppressed since the difference between the terminal voltage of the battery BT and the adapter voltage VAC supplied from the AC adapter 21 is small.

(4) The battery detection circuit 34 operates to reduce the control current Isc when the operation power supply voltage decreases such as when the electronic device 31 stops operating. The AC adapter 21 then generates a low adapter voltage VAC. Thus, a margin for the power supply voltage is provided during operation of the battery detection circuit 34, and the operating conditions are moderated. Furthermore, the AC adapter 21 supplies low adapter voltage VAC to the electronic device 31. Thus, high adapter voltage VAC is not supplied to the electronic device 31 when the electronic device 31 stops operating. This prevents the circuits in the electronic device 31 from being damaged.

It should be apparent to those skilled in the art that the present invention may be embodied in many other specific forms without departing from the spirit or scope of the invention.

In the above embodiment, the resistor R3 (correction resistor circuit) may be arranged on the semiconductor device (chip) that incorporates the battery detection circuit 34. The correction resistor circuit may be formed from polysilicon or may be formed by a MOS transistor. When the resistor element is formed by a MOS transistor, the gate voltage of the resistor element (i.e., the on-resistance of the MOS transistor) is controlled in accordance with the parasitic resistance of the cable W1.

In the above embodiment, instead of a single resistor R3, the correction resistor circuit may be formed by a plurality of resistor elements (polysilicon or MOS transistor). In this case, the one or more resistor elements are selected in accordance with the parasitic resistance of the cable W1.

In the above embodiment, instead of using the correction resistor R3 the correction voltage Vh may be generated by adjusting the level of the current detection signal S1 output from the current amplifier 41. In this case, the correction voltage Vh may be changed in accordance with the parasitic resistance of the cable W1 by changing the gain of level adjustment.

In the above embodiment, the end of the cable W1 does not need to be fixed to the AC adapter 21. For example, the cable may be coupled to the AC adapter and the electronic device when required by arranging connectors at the two ends of the cable.

In the above embodiment, the control current Isc is supplied from the battery detection circuit 34 of the electronic device 31 to the AC adapter 21. Further, the voltage control circuit 23 of the AC adapter 21 sets the adapter voltage VAC at the minimum voltage when the control current Isc is zero. This process may be performed by the battery detection circuit. In this case, the control current Isc is supplied from the AC adapter to the battery detection circuit.

In the above embodiment, the adapter voltage VAC does not need to be proportional to the control current Isc. The relationship between the control current Isc and the adapter voltage VAC may be changed as required.

In the above embodiment, the output voltage of the current voltage conversion circuit 50 may be used as the control signal instead of the control current Isc.

In the above embodiment, the control signal generation circuit 60 may be formed by the error amplifier 47, the diode D14, the current voltage conversion circuit 50, and the transistor T21. It is preferred that the control signal generation circuit 60 be formed by the error amplifiers 42 and 47, the diodes D11 and D14, the current voltage conversion circuit 50, and the transistor T21. When the electronic device 31 incorporates the battery BT, it is preferred that the control signal generation circuit 60 be formed by the error amplifiers 42, 44, 45, and 47, the diodes D11, D12, D13, and D14, the current voltage conversion circuit 50, and the transistor T21.

The circuit configurations for the AC adapter and the electronic device are not limited to that of the above embodiment.

What is claimed is:

1. A detection circuit for generating a control signal for controlling direct current input voltage generated by an external power supply based on power information provided from the external power supply via a cable, the detection circuit comprising:
   a correction voltage generation circuit that generates correction voltage in accordance with a parasitic resistance of the cable;
   a power information correction circuit coupled to the correction voltage generation circuit to receive the power information via the cable in which the power information correction circuit corrects the power information with the correction voltage and generates corrected power information;
   a detection signal generation circuit that calculates a total power amount from the input voltage and input current, which is supplied from the external power supply, to generate a power detection signal corresponding to the total power amount; and
   a control signal generation circuit coupled to the power information correction circuit and the detection signal generation circuit to generate the control signal from the corrected power information and the power detection signal.

2. The detection circuit according to claim 1, wherein the correction voltage generation circuit includes:
   a correction current generation circuit that generates a correction current in accordance with the input current; and
   a resistor circuit coupled to the correction current generation circuit and having a resistance value corresponding to the parasitic resistance of the cable, wherein the correction voltage is generated at a node between the correction current generation circuit and the resistor circuit based on the resistance value and the correction current.

3. The detection circuit according to claim 2, wherein the resistor circuit includes a plurality of resistors, and one or more of the plurality of resistors is used in accordance with the parasitic resistance of the cable.

4. The detection circuit according to claim 2, further comprising:
   a current amplifier that generates a current detection signal corresponding to the input current;
   wherein the correction current generation circuit is coupled to the current amplifier and generates the correction current based on the current detection signal.

5. The detection circuit according to claim 1, wherein the power information generation circuit generates the corrected power information by adding the correction voltage to the power information.

6. The detection circuit according to claim 1, further comprising:
   a current amplifier for generating a current detection signal corresponding to the input current;
   wherein the correction voltage generation circuit is coupled to the current amplifier and generates the correction voltage based on the current detection signal; and
   the power information generation circuit generates the corrected power information by adding the correction voltage to the power information.

7. The detection circuit according to claim 1, further comprising:
- a current amplifier for generating a current detection signal corresponding to the input current;
- the control signal generation circuit including:
- a first error amplifier coupled to the current amplifier to compare the current detection signal with a current reference signal and generate a first error voltage; and
- a second error amplifier coupled to the power information correction circuit and the detection signal generation circuit to compare the corrected power information with the power detection signal and generate a second error voltage, wherein either one of the first error voltage and the second error voltage is output as the control signal; and
- wherein the correction voltage generation circuit is coupled to the current amplifier to generate the correction voltage based on the current detection signal.

8. A power supply system comprising:
- an external power supply that generates direct current input voltage; and
- an electronic device that operates on the input voltage supplied from the external power supply via a cable, wherein:
- the external power supply includes a voltage control circuit that generates the input voltage and provides power information corresponding to the input voltage to the electronic device via the cable; and
- the electronic device includes a detection circuit for generating a control signal that controls the input voltage based on the power information, the detection circuit including:
- a correction voltage generation circuit that generates correction voltage in accordance with a parasitic resistance of the cable;
- a power information correction circuit coupled to the correction voltage generation circuit to receive the power information via the cable in which the power information correction circuit corrects the power information with the correction voltage and generates corrected power information;
- a detection signal generation circuit that calculates a total power amount of the electronic device from the input voltage and input current, which is supplied from the external power supply to the electronic device and generates a power detection signal corresponding to the total power amount; and
- a control signal generation circuit coupled to the power information correction circuit and the detection signal generation circuit to generate the control signal based on the corrected power information and the power detection signal.

9. The power supply system according to claim 8, wherein the correction voltage generation circuit includes:
- a correction current generation circuit that generates a correction current in accordance with the input current; and
- a resistor circuit coupled to the correction current generation circuit and having a resistance value corresponding to the parasitic resistance of the cable, wherein the correction voltage is generated at a node between the correction current generation circuit and the resistor circuit based on the resistance value and the correction current.

10. The power supply system according to claim 9, wherein the resistor circuit includes a plurality of resistors, and one or more of the plurality of resistors is selected in accordance with the parasitic resistance of the cable.

11. The power supply system according to claim 9, wherein:
- the detection circuit further includes a current amplifier that generates a current detection signal corresponding to the input current; and
- the correction current generation circuit is coupled to the current amplifier and generates the correction current based on the current detection signal.

12. The power supply system according to claim 8, wherein the power information generation circuit generates the corrected power information by adding the correction voltage to the power information.

13. The power supply system according to claim 8, wherein:
- the detection circuit further includes a current amplifier for generating a current detection signal corresponding to the input current;
- the correction voltage generation circuit is coupled to the current amplifier and generates the correction voltage based on the current detection signal; and
- the power information generation circuit generates the corrected power information by adding the correction voltage to the power information.

14. The power supply system according to claim 8, wherein:
- the detection circuit further includes a current amplifier for generating a current detection signal corresponding to the input current;
- the control signal generation circuit includes:
- a first error amplifier coupled to the current amplifier to compare the current detection signal with a current reference signal and generate a first error voltage; and
- a second error amplifier coupled to the power information correction circuit and the detection signal generation circuit to compare the corrected power information with the power detection signal and generate a second error voltage, wherein either one of the first error voltage and the second error voltage is output as the control signal; and
- the correction voltage generation circuit is coupled to the current amplifier to generate the correction voltage based on the current detection signal.

15. A method for controlling direct current input voltage generated by an external power supply based on power information provided from the external power supply comprising:
- receiving the power information via a cable;
- generating correction voltage in accordance with a parasitic resistance of the cable;
- correcting the power information with the correction voltage to generate corrected power information;
- calculating a total power amount from the input voltage and input current, which is supplied from the external power supply, to generate a power detection signal corresponding to the total power amount; and
- generating a control signal from the corrected power information and the power detection signal.

16. The method according to claim 15, wherein the generation of the control signal is performed in an electronic device coupled to the external power supply via the cable.

* * * * *